US009449381B2

United States Patent
Liang

(10) Patent No.: US 9,449,381 B2
(45) Date of Patent: Sep. 20, 2016

(54) METHODS, SYSTEMS, AND MEDIA FOR GENERATING AND ANALYZING MEDICAL IMAGES HAVING ELONGATED STRUCTURES

(71) Applicant: Arizona Board of Regents, a body corporate of the State of Arizona, acting for and on behalf of Arizona State University, Scottsdale, AZ (US)

(72) Inventor: Jianming Liang, Phoenix, AZ (US)

(73) Assignee: Arizona Board of Regents, a body corporate of the State of Arizona, acting for and on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/023,380

(22) Filed: Sep. 10, 2013

(65) Prior Publication Data

US 2014/0072191 A1 Mar. 13, 2014

Related U.S. Application Data

(60) Provisional application No. 61/699,114, filed on Sep. 10, 2012.

(51) Int. Cl.
| | |
|---|---|
| *G06K 9/00* | (2006.01) |
| *G06T 7/00* | (2006.01) |
| *G06T 3/60* | (2006.01) |
| *G06T 11/00* | (2006.01) |

(52) U.S. Cl.
CPC .............. *G06T 7/0012* (2013.01); *G06T 3/60* (2013.01); *G06T 7/004* (2013.01); *G06T 11/008* (2013.01); *G06T 2207/10081* (2013.01); *G06T 2207/30101* (2013.01)

(58) Field of Classification Search
CPC ................ G06T 2207/30101; G06T 7/0012; G06T 15/08; G06T 19/00; G06T 2200/04; G06T 2207/10081; G06T 2207/20044; G06T 2207/20148; G06T 2207/30064; G06T 2210/41; G06T 2215/06; G06T 2219/008; G06T 7/0024
See application file for complete search history.

(56) References Cited

U.S. PATENT DOCUMENTS

| | | |
|---|---|---|
| 7,526,101 B2 | 4/2009 | Avidan |
| 7,840,061 B2 | 11/2010 | Porikli et al. |

(Continued)

OTHER PUBLICATIONS

Frangi et al., Model-Based Quantitation of 3-D Magnetic Resonance Angiographic Images, Oct. 1999, IEEE Transactions on Medical Imaging, vol. 18, No. 10, pp. 946-956.*

(Continued)

*Primary Examiner* — Vu Le
*Assistant Examiner* — Guillermo Rivera-Martinez
(74) *Attorney, Agent, or Firm* — Bryne Poh LLP

(57) ABSTRACT

Methods, systems, and media for generating and/or analyzing medical images having elongated structures are provided. In some embodiments, a method for analyzing medical images is provided, the method comprising: receiving a plurality of images, wherein each of the plurality of images includes a portion of an elongated structure; receiving a location of interest within a least one of the plurality of images; determining an orientation of the elongated structure in response to receiving the location of interest; adjusting image planes of each of the plurality of images to correspond with the orientation of the elongated structure; and causing the elongated structure to be displayed in the adjusted image planes.

20 Claims, 7 Drawing Sheets

(56) References Cited

U.S. PATENT DOCUMENTS

| | | | |
|---|---|---|---|
| 2003/0199762 A1 | 10/2003 | Fritz et al. | |
| 2005/0220336 A1 | 10/2005 | Sabe et al. | |
| 2005/0228276 A1 | 10/2005 | He et al. | |
| 2007/0280530 A1 | 12/2007 | Fung et al. | |
| 2008/0009733 A1 | 1/2008 | Saksena | |
| 2008/0154565 A1 | 6/2008 | Florin et al. | |
| 2008/0171939 A1 | 7/2008 | Ishihara | |
| 2008/0192887 A1* | 8/2008 | Weese et al. | 378/41 |
| 2008/0205750 A1 | 8/2008 | Porikli et al. | |
| 2008/0240532 A1 | 10/2008 | Carneiro et al. | |
| 2008/0260230 A1 | 10/2008 | Gotardo et al. | |
| 2009/0034816 A1* | 2/2009 | Ghanem et al. | 382/131 |
| 2009/0060307 A1* | 3/2009 | Ghanem et al. | 382/131 |
| 2009/0175515 A1 | 7/2009 | Schummers | |
| 2009/0252394 A1* | 10/2009 | Liang et al. | 382/131 |
| 2010/0046815 A1* | 2/2010 | Von Berg et al. | 382/128 |
| 2010/0061601 A1* | 3/2010 | Abramoff et al. | 382/117 |
| 2010/0098308 A1 | 4/2010 | Lakare et al. | |
| 2010/0113930 A1 | 5/2010 | Miyachi | |
| 2010/0177944 A1 | 7/2010 | Madabhushi et al. | |
| 2011/0270089 A1 | 11/2011 | Vezina | |
| 2011/0293157 A1 | 12/2011 | Ye et al. | |
| 2012/0089545 A1 | 4/2012 | Mei et al. | |
| 2012/0106815 A1* | 5/2012 | Yang et al. | 382/131 |
| 2012/0274755 A1 | 11/2012 | Sinha et al. | |
| 2013/0070997 A1 | 3/2013 | Tajbakhsh et al. | |

OTHER PUBLICATIONS

"Deep Vein Thrombosis Overview", Technical Report, Society of Interventional Radiology, last accessed Sep. 17, 2014, pp. 1-3, available at: http://www.sirweb.org/patients/deep-vein-thrombosis/.

Bi, J. and Liang, J., "Multiple instance learning of pulmonary embolism detection with geodesic distance along vascular structure", In Proceedings of IEEE Computer Society Conference on Computer Vision and Pattern Recognition (CVPR) Jun. 17-22, 2007, Minneapolis, MN, USA, pp. 1-8.

Bouma, H., "Vessel-Diameter Quantification and Embolus Detection in CTA Images." Ph.D. Thesis, Eindhoven University of Technology, PrintPartners, Ipskamp, The Netherlands, Apr. 2008, pp. 9-133.

Bouma, H., et al, "Automatic Detection of Pulmonary Embolism in CTA Images", In IEEE Transactions on Medical Imaging, vol. 28, No. 8, Aug. 2009, pp. 1223-1230.

Bourdev, L. and Brandt, J., et al., "Robust Object Detection Via Soft Cascade", In Proceedings of the 2005 IEEE Conference on Computer Vision and Pattern Recognition (CVPR '05), Washington, DC, USA, Jun. 2005, pp. 236-243.

Chartrand-Lefebvre, C., "Computed tomography angiography in the diagnosis of pulmonary embolism: Interobserver agreement", In American Journal of Emergency Medicine, Jan. 27, 2011, pp. 118-119.

Cho, E.J., et al., "Right ventricular free wall circumferential strain reflects graded elevation in acute right ventricular afterload", In Am J Physiol Heart Circ Physiol., Feb. 2009, vol. 296, No. 2, pp. 818-824.

Costantino, G., et al., "Interobserver agreement in computer tomography readings for pulmonary embolism", In American Journal of Emergency Medicine, Jan. 27, 2011, pp. 119.

Costantino, G., et al., "Interobserver agreement in computer tomography readings for pulmonary embolism", In American Journal of Emergency Medicine, vol. 27, No. 9, Nov. 2009, pp. 1109-1111.

Craig, J.J., "Introduction to Robotics: Mechanics and Control", 3rd edition, Prentice Hall, Aug. 6, 2004, pp. 1-385.

Criminisi, A., et al., "Regression Forests for Efficient Anatomy Detection and Localization in CT Studies", In Proceedings of the International Workshop on Medical Computer Vision, Beijing, CN, Sep. 2010, pp. 106-117.

Crow, F.C., "Summed-Area Tables for Texture Mapping", In Computer Graphics, vol. 18, No., Jul. 3, 1984, pp. 207-212.

Dinesh, M.S., et al, "Adaptive Contrast-Based Computer Aided Detection for Pulmonary Embolism", In Proceedings of the SPIE International Society Conference for Optimal Engineering, Mar. 2009, vol. 7260, No. 726010, pp. 1-8.

Dollar, P., et al., "Multiple Component Learning for Object Detection", In Proceedings of the 10th European Conference on Computer Vision: Part II (ECCV '08), Marseille, FR, Oct. 12-18, 2008, pp. 211-224.

Dousset, M., et al., "Principles and performance of virtual CT and MIRA intraluminal endoscopy", In Virtual Endoscopy, Springer, Nov. 2002, pp. 1-19.

Frangi, A.F., et al., "Multiscale vessel enhancement filtering", In Medical Image Computing and Computer-Assisted Intervention, Oct. 11-13, 1998, pp. 130-137.

Freund, Y. and Schapire, R.E., "A Decision-Theoretic Generalization of On-Line Learning and an Application to Boosting", In Journal of Computer and System Sciences, vol. 55, No. 1, Aug. 1997, pp. 119-139.

Freund, Y. and Schapire, R.E., "A Short Introduction to Boosting", In Journal of Japanese Society for Artificial Intelligence, vol. 14, No. 5, Sep. 1999, pp. 771-780.

Galson, S.K., "The surgeon general's call to action to prevent deep vein thrombosis and pulmonary embolism", Technical Report, U.S. Public Health Services, Sep. 15, 2008, pp. 1-35.

Godec, M., et al., "On-line Random Naive Bayes for Tracking", In Proceedings of the 20th International Conference (ICPR '10), Istanbul, TR, Aug. 23-26, 2010, pp. 3545-3548.

Goldstein, H., "Classical Mechanics", 2nd Edition, Jul. 1980, pp. 1-2.

Grabner, H. and Bischof, H., "On-line Boosting and Vision", In Proceedings of the IEEE Computer Society Conference on Computer Vision and Pattern Recognition (CVPR '06), New York, NY, USA, Jun. 17-22, 2006, pp. 260-267.

Grbovic, M. and Vucetic, S., "Tracking Concept Change with Incremental Boosting by Minimization of the Evolving Exponential Loss", In Proceedings of the European Conference on Machine Learning and Knowledge Discovery in Databases, Athens, GR, Sep. 5-9, 2011, pp. 516-532.

Groth, M., et al., "Correlation of right ventricular dysfunction parameters and pulmonary vascular obstruction score in acute pulmonary embolism in a porcine model", In Emergency Radiology, Sep. 2010, pp. 367-374.

He, H., et al., "Incremental Learning from Stream Data," In IEEE Transactions on Neural Networks, vol. 22, No. 12, Dec. 2011, pp. 1901-1914.

International Patent Application No. PCT/US2013/024675, filed Feb. 4, 2013.

International Patent Application No. PCT/US2013/024677, filed Feb. 4, 2013.

International Preliminary Report on Patentability dated Aug. 22, 2013 in International Patent Application No. PCT/US2012/024925.

International Preliminary Report on Patentability in International Application No. PCT/US2012/024907, filed Feb. 13, 2012, mailed Aug. 22, 2013.

International Search Report in International Patent Application No. PCT/US2012/024925, filed Feb. 13, 2012, mailed Jun. 19, 2012.

International Search Report in International Patent Application No. PCT/US2013/024675, filed Feb. 4, 2013, mailed Apr. 16, 2013.

International Search Report in International Patent Application No. PCT/US2013/024677, filed Feb. 4, 2013, mailed Apr. 15, 2013.

Kanitsar, A., et al., "CPR—Curved Planar Reformation", In Proceedings of IEEE Visualization, Nov. 1, 2002, pp. 37-44.

Kim, T.K., et al., "Online Multiple Classier Boosting for Object Tracking", In Proceedings of the 2010 IEEE Computer Society Conference on Computer vision and Pattern Recognition Workshops (CVPRW '10), San Francisco, CA, USA, Jun. 13-18, 2010, pp. 1-6.

Kiraly, A.P., et al., "Cartwheel projections of segmented pulmonary vasculature for the detection of pulmonary embolism", In Medical Imaging: Visualization, Image-Guided Procedures, and Display, Proc. SPIE 5744, Apr. 12, 2005, pp. 69-78.

(56) References Cited

OTHER PUBLICATIONS

Knutsson, H., "Representing Local Structure using Tensors", In Proceedings of the 6th Scandinavian Conference on Image Analysis, Oulu, Finland, Jun. 1989, pp. 244-251.

Kothe, U., "Edge and Junction Detection with an Improved Structure Tensor", In Proceedings of the 25th DAGM Symposium on Pattern Recognition, Magdeburg, DE, Sep. 10-12, 2003, pp. 25-32.

Kurkure, U., et al., "Automated Segmentation of Thoracic Aorta in Non-Contrast CT Images", In Proceedings of the 5th International Symposium on Biomedical Imaging: From Nano to Macro (ISBI '08), Paris, FR, May 14-17, 2008, pp. 29-32.

Leistner, C., et al., "On Robustness of On-Line Boosting—A Competitive Study", In Proceedings of the 2009 IEEE 12th International Conference on Computer Vision Workshops (ICCVW '09), Kyoto, JP, Sep. 27-Oct. 4, 2009, pp. 1362-1369.

Liang, J. and Bi, J., "Computer Aided Detection of Pulmonary Embolism with Tobogganing and Multiple Instance Classification in CT Pulmonary Angiography", In Proceedings of the 20th Intl Conference of Information Processing in Medical Imaging Kerkrade, NL, Jul. 2-6, 2007, pp. 630-641.

Liang, J. and Bi, J., "Local Characteristic Features for Computer-Aided Detection of Pulmonary Embolism in CT Angiography", In Proceedings of the First Workshop on Pulmonary Image Analysis, New York, NY, US, Sep. 6, 2008, pp. 263-272.

Liu, D., et al., "Search strategies for multiple landmark detection by submodular maximization", IEEE Conference on Computer Vision and Pattern Recognition, Jun. 3-8, 2010, San Francisco, CA, USA, pp. 2831-2838.

Liu, X. and Yu, T., "Gradient Feature Selection for Online Boosting", In Proceedings of the IEEE 11TH International Conference on Computer Vision (ICCV '07), Rio de Janeiro, BR, Oct. 14-21, 2007, pp. 1-8.

Lorenz, C., et al., "Multi-scale line segmentation with automatic estimation of width, contrast and tangential direction in 2-D and 3-D medical images", In Proceedings of the 1st Joint Conference on CVRMed-MRCAS, London, UK, Mar. 19-22, 1997, pp. 233-242.

Masutani, Y., et al., "Computerized Detection of Pulmonary Embolism in Spiral CT Angiography Based on Volumetric Image Analysis", In IEEE Transactions on Medical Imaging, vol. 21, No. 12, Dec. 2002, pp. 1517-1523.

Office Action dated Jul. 17, 2014 in U.S. Appl. No. 13/621,837.
Office Action dated Aug. 16, 2013 in U.S. Appl. No. 13/984,800.
Office Action dated Aug. 23, 2013 in U.S. Appl. No. 13/984,808.
Office Action dated Sep. 18, 2013 in European Patent Application No. 12744949.4.

Ouellette, D.R., et al., "Pulmonary Embolism", Medscape.com, last updated Sep. 4, 2014, available at: http://emedicine.medscape.com/article/300901-overview#showall, pp. 1-24.

Oza, N. C. and Russell, S., "Online Bagging and Boosting", In 8th International Workshop on Artificial Intelligence and Statistics, Key West, FL, USA, Jan. 2001, pp. 105-112.

Parag, T., et al., "Boosting Adaptive Linear Weak Classifiers for Online Learning and Tracking", In Proceedings of the IEEE Conference on Computer Vision and Recognition (CVPR '08), Anchorage, AK, USA, Jun. 23-28, 2008, pp. 1-8.

Parikh, D. and Polikar, R., "An Ensemble-Based Incremental Learning Approach to Data Fusion", In IEEE Transactions on Systems, Man, Cybernetics, Part B: Cybernetics, vol. 37, No. 2, Apr. 2007, pp. 437-450.

Pelossof, R., et al., "Online Coordinate Boosting", In Proceedings of the 2009 IEEE 12th International Conference on Computer Vision Workshops, (ICCVW '09), Kyoto, JP, Sep. 27-Oct. 4, 2009, pp. 1354-1361.

Pham, M. and Cham, T., "Detection with Multi-exit Asymmetric Boosting", In Proceedings of the IEEE Conference on Computer Vision and Pattern Recognition (CVPR '08), Anchorage, AK, USA, Jun. 23-28, 2008, pp. 1-8.

Pham, M. and Cham, T., "Fast Training and Selection of Haar Features Using Statistics in Boosting-Based Face Detection", In Proceedings of the IEEE 11th International Conference on Computer Vision (ICCV '07), Rio de Janeiro, BR, Oct. 14-21, 2007, pp. 1-7.

Pham, M. and Cham, T., "Online Learning Asymmetric Boosted Classifiers for Object Detection", In Proceedings of the IEEE Conference on Computer Vision and Recognition (CVPR '07), Minneapolis, MN, USA, Jun. 17-22, 2007, pp. 1-8.

Sato, Y. et al., "3-D multi-scale line filter for segmentation and visualization of curvilinear structures in medical images", In Proceedings of the 1st Joint Conference on CVRMed-MRCAS, London, UK, Mar. 19-22, 1997, pp. 213-222.

Schapire, R. E. and Singer, Y., "BoosTexter: A Boosting-Based System for Text Categorization", In Machine Learning, vol. 39, No. 2, May 1, 2000, pp. 135-168.

Schapire, R. E., "Theoretical Views of Boosting and Applications", In Algorithmic Learning Theory, Lecture Notes in Computer Science, vol. 1720, Dec. 1999, pp. 13-25.

Sebbe, R., "Computer-aided Diagnosis of Pulmonary Embolism in Opacified CT Images", Ph.D. Dissertation, Faculte Polytechnique de Mons, Universitaires de Louvain, Belgium, Feb. 20, 2007, pp. 1-124.

Simon, M., et al., "Paddle-wheel CT display of pulmonary arteries and other lung structures: a new imaging approach", In American Journal of Roentgenology, Jul. 2001, pp. 195-198.

Simon, M., et al., "Paddle-wheel multislice helical CT display of pulmonary vessels and other lung structures", In Radiologic Clinics of North America, May 2003, pp. 617-626.

Stein, P.D. and Hull, R.D., "Multidetector computed tomography for the diagnosis of acute pulmonary embolism", In Current Opinion Pulmonary Medicine, Sep. 2007, pp. 384-388.

Stein, P.D. and Matta, F., "Acute Pulmonary Embolism", In Current Problems in Cardiology, vol. 35, No. 7, Jul. 2010, pp. 314-376.

Sternig, S., et al., "Transient Boost: On-line Boosting with Transient Data", In Proceedings of the 2010 IEEE Computer Society Conference on Computer Vision and Pattern Recognition Workshops (CVPRW '10), San Francisco, CA, USA, Jun. 13-18, 2010, pp. 22-27.

Torbicki, A., et al., "Guidelines on the diagnosis and management of acute pulmonary embolism of the European Society of Cardiology", In Eur Heart J., vol. 29, No. 18, Sep. 2008, pp. 2276-2315.

Vaidehi, V., et al., "Multiclass Object Detection System in Imaging Sensor Network Using Haar-like Features and Joint-Boosting Algorithm", In Proceedings of the 2011 International Conference on Recent Trends in Information Technology (ICRTIT '11), Chennai, Tamil Nadu, IN, Jun. 3-5, 2011, pp. 1011-1015.

Viola, P. and Jones M., "Fast and Robust Classification Using Asymmetric AdaBoost and a Detector Cascade", In Proceedings of the Annual Conference on Neural Information Processing Systems, Vancouver, BC, CA, Dec. 3-8, 2001, pp. 1311-1318.

Viola, P. and Jones, M., "Rapid Object Detection using a Boosted Cascade of Simple Features", In Proceedings of the IEEE Computer Society Conference on Computer Vision and Pattern Recognition, Kauai, HI, USA. Dec. 8-14, 2001, pp. 511-518.

Written Opinion in International Patent Application No. PCT/US2012/024925, filed Feb. 13, 2012, mailed Jun. 19, 2012.
Written Opinion in International Patent Application No. PCT/US2013/024675, filed Feb. 4, 2013, mailed Apr. 16, 2013.
Written Opinion in International Patent Application No. PCT/US2013/024677, filed Feb. 4, 2013, mailed Apr. 15, 2013.

Wu, B. and Nevatia, R., "Improving Part Based Object Detection by Unsupervised, Online Boosting", In Proceedings of the IEEE Conference on Computer Vision and Pattern Recognition (CVPR '07), Minneapolis, MN, USA, Jun. 17-22, 2007, pp. 1-8.

Wu, H., et al., "Machine Learning based Automatic Detection of Pulmonary Trunk", In Proceedings of the SPIE Conference on Medical Imaging 2011: Computer-Aided Diagnosis, Lake Buena Vista, FL, USA, Feb. 12, 2011, vol. 7963, pp. 1-6.

Zheng, Y., et al., "Automatic Aorta Segmentation and Valve Landmark Detection in C-Arm CT: Application to Aortic Valve Implantation", In IEEE Transactions on Medical Imaging, vol. 31, No. 12, Dec. 2012, pp. 2307-2321.

Zheng, Y., et al., "Fast Automatic Heart Chamber Segmentation from 3D CT Data Using Marginal Space Learning and Steerable

(56) References Cited

OTHER PUBLICATIONS

Features", In Proceedings of the IEEE 11th International Conference on Computer Vision (ICCV '07), Rio de Janeiro, BR, Oct. 14-21, 2007, pp. 1-8.

Zhou, C., et al., "Automatic Pulmonary Vessel Segmentation in 3D Computed Tomographic Pulmonary Angiographic (CTPA) Images", In Proceedings of the SPIE 6144, Medical Imaging: Image Processing, Mar. 15, 2006, pp. Q1-Q7.

Zhou, S. K., et al., "A Boosting Regression Approach to Medical Anatomy Detection", In Proceedings of the IEEE Conference on Computer Vision and Pattern Recognition (CVPR '07), Minneapolis, MN, USA, Jun. 17-22, 2007, pp. 1-8.

Zou, X., et al., "Anatomy-Based Automatic Detection and Segmentation of Major Vessels in Thoracic CTA Images", In Computerized Medical Imaging and Graphics, vol. 30, No. 5, Jul. 2006, pp. 299-313.

Alonso-Martinez, J.L., et al., "Delay and misdiagnosis in submassive and non-massive acute pulmonary embolism", In European Journal of Internal Medicine, vol. 21, No. 4, Aug. 2010, pp. 278-282.

Araoz, P.A., et al., "Helical ct pulmonary angiography predictors of in-hospital morbidity and mortality in patients with acute pulmonary embolism", In Journal of Thoracic Imaging, vol. 18, Oct. 2003, pp. 207-216.

Bottiger, B.W., et al., "Inhaled nitric oxide selectively decreases pulmonary artery pressure and pulmonary vascular resistance following acute massive pulmonary microembolism in piglets", In Chest, vol. 110, No. 4, Oct. 1996, pp. 1041-1047.

Collomb, J., et al., "Severity Assessment of Acute Pulmonary Embolism: Evaluation using Helical CT", In European Radiology, vol. 13, No. 7, Feb. 2003, pp. 1508-1514.

Dias-Junior, C.A., "The effect of sildenafil on pulmonary embolism-induced oxidative stress and pulmonary hypertension", In Anesthesia & Analgesia, vol. 101, No. 1, Jul. 2005, pp. 115-120.

Ghaye, B., et al., "Can CT Pulmonary Angiography Allow Assessment of Severity and Prognosis in Patients Presenting with Pulmonary Embolism? What the Radiologist Needs to Know", In RadioGraphics, vol. 26, Jan. 2006, pp. 23-29.

Ghaye, B., et al., "Severe pulmonary embolism: pulmonary artery clot load scores and cardiovascular parameters as predictors of mortality," In Radiology, vol. 239, Apr. 2006, pp. 884-891.

Grifoni, S.,"Short-term clinical outcome of patients with acute pulmonary embolism, normal blood pressure, and echocardiographic right ventricular dysfunction", In Circulation, vol. 101, No. 24, Jun. 2000, pp. 2817-2822.

Howard, G., et al., "For the ARIC Investigators: Carotid artery intimal-medial thickness distribution in general populations as evaluated by B-mode ultrasound", In Stroke, vol. 24, No. 9, Sep. 1993, pp. 1297-1304.

Hurst, R., et al., "Clinical use of carotid intima-media thickness: review of the literature", In Journal of the American Society of Echocardiography, vol. 20, No. 7, Jul. 2007, pp. 907-914.

Jardin, F., et al., "Echocardiographic pattern of acute cor pulmonale", In Chest, vol. 111, No. 1, Jan. 1997, pp. 209-217.

Kass, M., et al., "Snakes: Active contour models," In International Journal of Computer Vision, vol. 1, No. 4, Jan. 1988, pp. 321-331.

Levenberg, K., "A method for the solution of certain non-linear problems in least squares", In Quarterly Journal of Applied Mathmatics, vol. 2, Jul. 1944, pp. 164-168.

Li, S., et al., "Childhood cardiovascular risk factors and carotid vascular changes in adulthood: the Bogalusa Heart Study", In Journal of the American Medical Association, vol. 290, Nov. 2003, pp. 2271-2276.

Liang, J., et al., "United Snakes", In Medical Image Analysis, vol. 10 No. 2, Apr. 2006, vol. 215-233.

Mansencal, N., "Comparison of different echocardiographic indexes secondary to right ventricular obstruction in acute pulmonary embolism", In The American Journal of Cardiology, vol. 92, No. 1, Jul. 2003, pp. 116-119.

Marquardt, D.W., "An Algorithm for Least-Squares Estimation of Nonlinear Parameters", In SIAM Journal on Applied Mathematics, vol. 11 No. 2, Jun. 1963, pp. 431-441.

Mastora, I., "Severity of acute pulmonary embolism: evaluation of a new spiral ct angiographic score in correlation with echocardiographic data", In European Radiology, vol. 13, Jan. 2003, pp. 29-35.

McConnell, M.V., et al., "Regional right ventricular dysfunction detected by echocardiography in acute pulmonary embolism", In the American Journal of Cardiology, vol. 78 No. 4, Aug. 1996, pp. 469-473.

Office Action dated Jan. 22, 2015 in U.S. Appl. No. 14/376,181.

Office Action dated Jan. 29, 2015 in U.S. Appl. No. 13/621,837.

Ribeiro, A., et al., "Echocardiography doppler in pulmonary embolism: Right ventricular dysfunction as a predictor of mortality rate", In American Heart Journal, vol. 134, No. 3, Mar. 1997, pp. 479-487.

Stein, J., et al., "A semiautomated ultrasound border detection program that facilitates clinical measurement of ultrasound carotid intima-media thickness", In Journal of the American Society of Echocardiography, vol. 18, No. 3, Mar. 2005, pp. 244-251.

Stein, J., et al., "Use of Carotid Ultrasound to Identify Subclinical Vascular Disease and Evaluate Cardiovascular Disease Risk: A Consensus Statement from the American Society of Echocardiography Carotid Intima-Media Thickness Task Force", In JASE, vol. 21, No. 2, Apr. 2008, pp. 93-111.

Stein, J., et al., "Vascular age: Integrating carotid intima-media thickness measurements with global coronary risk assessment", In Clinical Cardiology, vol. 27, No. 7, Jul. 2004, pp. 388-392.

Tajbakhsh, N., et al., "Motion analysis of right ventricular dysfunction under mild and moderate pressure overload caused by acute pulmonary embolism", in Ultrasound in Medicine and Biology, vol. 39, No. 11, Nov. 2013, pp. 2066-2074.

Tajbakhsh, N., et al., "Shape-based analysis of right ventricular dysfunction associated with acute pulmonary embolism", In SPIE Medical Imaging, vol. 8317, Mar. 2012, pp. 1-5.

Takamura, T., et al., "Reversible left ventricular regional non-uniformity quantified by speckle-tracking displacement and strain imaging in patients with acute pulmonary embolism," In Journal of the American Society of Echocardiography, vol. 24, No. 7, Apr. 2011, pp. 792-802.

Wu, H., "Offline and Online Adaboost for Detecting Anatomical Structures", Thesis Paper, Arizona State University, Aug. 2011, pp. 1-66.

Wu, H., et al. "Self-Adaptive Asymmetric On-line Boosting for Detecting Anatomical Structures", In SPIE Medical Imaging, vol. 8315, Feb. 2012, pp. 1-7.

\* cited by examiner

METHODS, SYSTEMS, AND MEDIA FOR GENERATING AND ANALYZING MEDICAL IMAGES HAVING ELONGATED STRUCTURES

CROSS-REFERENCE TO RELATED APPLICATIONS

This application claims the benefit of U.S. Provisional Patent Application No. 61/699,114, filed Sep. 10, 2012, which is hereby incorporated by reference herein in its entirety.

TECHNICAL FIELD

The disclosed subject matter relates to methods, systems, and media for generating and analyzing medical images. More particularly, the disclosed subject matter relates to generating and analyzing medical images having elongated structures, such as blood vessels, lymphatic vessels, airways, gastrointestinal tracts (e.g., portions of the large or small intestine, colon, etc.), and the like.

BACKGROUND

In an x-ray computed tomography ("CT") system, an x-ray source projects a fan- or cone-shaped beam of x-rays that is collimated to lie within an x-y plane of a Cartesian coordinate system, termed the "imaging plane." The x-ray beam passes through the object being imaged, such as a medical patient, and impinges upon an array of radiation detectors. The intensity of the transmitted radiation is dependent upon the attenuation of the x-ray beam by the object, and each detector produces a separate electrical signal that is a measurement of the beam attenuation. The attenuation measurements from all of the detectors are acquired separately to produce a transmission profile at a particular view angle.

The source and detector array in a conventional CT system are rotated on a gantry within the imaging plane, and around the object so that the angle at which the x-ray beam intersects the object constantly changes. A group of x-ray attenuation measurements from the detector array at a given angle is referred to as a "view," and a "scan" of the object includes a set of views acquired at different angular orientations during one revolution of the x-ray source and detector. In a 2D scan, data is processed to reconstruct an image that corresponds to a two-dimensional slice taken through the object. The prevailing method for reconstructing an image from 2D data is referred to in the art as the filtered backprojection technique. This process converts the attenuation measurements from a scan into integers called "CT numbers," or "Hounsfield units," which are used to control the brightness of a corresponding pixel on a display.

CT imaging is well suited to provide clinically useful images related to a variety of medical conditions. For example, CT pulmonary angiography (CTPA) is currently the diagnostic standard for investigating a suspected pulmonary embolism. A pulmonary embolism is a sudden blockage, such as a clot, in a lung artery due to an embolus that is formed in one part of the body and travels through the bloodstream to an artery of the lung. It is a common cardiovascular emergency with about 600,000 cases occurring annually and causing approximately 200,000 deaths in the United States. Most patients who succumb to pulmonary embolism do so within the first few hours following the event.

A major clinical challenge, particularly in an emergency department, is to quickly and correctly diagnose patients with a pulmonary embolism and dispatch them to treatment, so that hazardous yet life-saving therapy can be prescribed appropriately. Unfortunately, pulmonary embolisms are among the most difficult conditions to diagnose because its primary symptoms are protean and may be manifested by a number of other conditions that require different therapeutic interventions. The correct diagnosis of a pulmonary embolism has been found to be overlooked in as many as 84% of cases (which is estimated at about 450,000 cases each year in the United States), resulting in more than 34,000 preventable deaths, assuming a mortality rate of 7.7%. Not surprisingly then, the Surgeon General has called for action to help prevent deep vein thrombosis (DVT) and pulmonary embolisms.

As noted above, computed tomography or CT is used to visualize the pulmonary arteries so that a highly trained medical professional, such as a radiologist, can examine the CT images for indications of a pulmonary embolism. As such, medical imaging plays a key role in conducting clinical evaluations to diagnose pulmonary embolisms. Specifically, CTPA reveals embolus as a dark region residing in bright vessel lumen. As an imaging protocol, each CTPA scan consists of hundreds of axial images. The interpretation of these images is complex and time consuming because of the intricate branching structure of the pulmonary arteries, the demand for specialized knowledge to distinguish a pulmonary embolism from the various causes of cardiopulmonary pathology that may resemble a pulmonary embolism, and a myriad of artifacts that may obscure or mimic emboli (e.g., flow-related artifacts, streak artifacts, lymph nodes, and the like). The accuracy and efficiency of interpreting such large 3-D image datasets is further limited by human factors, such as attention span and eye fatigue.

Unfortunately, incorrect CTPA interpretations are not infrequent in clinical practice. The number of CTPA examinations has increased by an order of magnitude over the past decade, while studies have found that the rate of true positive examinations has fallen to about 5-10%.

There is therefore a need to mitigate rapidly mounting radiologist workloads and improve the efficiency and accuracy of a pulmonary embolism diagnosis. Accordingly, it is desirable to provide methods, systems, and media for generating and analyzing medical images having elongated structures that overcome these and other deficiencies of the prior art. For example, methods, systems, and media are provided that process one or more images by reformatting the image planes to be in alignment with the longitudinal axis of an elongated structure, such as a vessel, so that the user can scroll along the axis, spin around the longitudinal axis, and perform other operations, thereby facilitating a thorough inspection of the elongated structure from multiple perspectives and providing compelling demonstration of any defects (e.g., arterial filling defects).

SUMMARY

Mechanisms for generating and analyzing medical images having elongated structures are provided.

These mechanisms include, for example, receiving one or more images containing an elongated structure. The elongated structure can include portions of a blood vessel, a lymphatic vessel, an airway, a gastrointestinal tract (e.g., portions of the large or small intestine, the colon, etc.), etc. In a more particular example, the one or more images can be computed tomography pulmonary angiography images that are obtained for the computer-aided detection of indications of emboli.

These mechanisms can be initiated by receiving a location of interest in an image. For example, in some embodiments, the mechanisms can receive a user-selected location of interest in an image (e.g., a user using a user input device to select a location of interest within a displayed image). In a more particular example, the mechanisms can be used at any suitable location of interest including, for example, a radiologist's findings in a particular image. Additionally or alternatively, the mechanisms can receive a computer-generated location of interest in an image, such as, for example, a finding within an image from one or more computer-aided detection (CAD) systems. For example, the mechanisms can receive a computer-generated location of interest as an initial location and receive user-selected locations of interest as the user examines the elongated structure.

Upon receiving the location of interest, the location can be set as the center of the reformatted image plane in which the elongated structure is automatically rotated to align its longitudinal axis along the vertical centerline of the image plane for inspection and/or examination. In some embodiments, the mechanisms can animate the rotation from the initial image of the elongated structure to the reformatted image of the aligned elongated structure. The animation can be generated using, for example, the rotation matrices derived in accordance with Euler's rotation theorem. In some embodiments, the mechanism can provide additional inspection features for examining the elongated structure in the image, such as zooming into or out of an image, scrolling along the longitudinal axis of the aligned elongated structure, selecting an image plane, etc.

In some embodiments, the mechanisms can receive a new or updated location of interest. For example, the mechanisms can receive a new location of interest within a different elongated structure contained in the image. In response to receiving the new or updated location of interest, the mechanisms can continue to determine the orientation of the selected elongated structure and align the selected elongated structure based on its orientation or longitudinal axis.

It should be noted that these mechanisms can be used in a variety of applications. For example, these mechanisms can be used in a clinical environment to interpret image data received from a computed tomography imaging device. In another example, these mechanisms can be used by radiologists to accept or reject findings made by a computer-aided detection system. In yet another example, these mechanisms can be used by medical professional to further inspect and/or examine particular structures shown in the image data from multiple perspectives.

In accordance with various embodiments of the disclosed subject matter, a method for analyzing medical images is provided. The method comprises: receiving a plurality of images, wherein each of the plurality of images includes a portion of an elongated structure; receiving a location of interest within at least one of the plurality of images; determining an orientation of the elongated structure in response to receiving the location of interest; adjusting image planes of each of the plurality of images to correspond with the orientation of the elongated structure; and causing the elongated structure to be displayed in the adjusted image planes.

In some embodiments, the orientation of the elongated structure is represented by a longitudinal axis of the elongated structure. In some embodiments, the longitudinal axis of the elongated structure can be determined using a structure tensor, wherein the structure tensor summarizes predominant directions of a gradient in a neighborhood of the location. In some embodiments, the longitudinal axis of the elongated structure can be determined by segmenting the elongated structure. Additionally or alternatively, in some embodiments, the longitudinal axis of the elongated structure can be based on eigenvectors of the Hessian matrix.

In accordance with some embodiments, a system for analyzing medical images is provided, the system comprising: an imaging device that captures a plurality of medical images, wherein each of the plurality of medical images includes a portion of an elongated structure; and a processor connected to the imaging device. The processor is configured to: receive a plurality of images, wherein each of the plurality of images includes a portion of an elongated structure; receive a location of interest within at least one of the plurality of images; determine an orientation of the elongated structure in response to receiving the location of interest; adjust image planes of each of the plurality of images to correspond with the orientation of the elongated structure; and cause the elongated structure to be displayed in the adjusted image planes.

In accordance with some embodiments, a non-transitory computer-readable medium containing computer-executable instructions that, when executed by a processor, cause the processor to perform a method for analyzing medical images is provided, the method comprising: receiving a plurality of images, wherein each of the plurality of images includes a portion of an elongated structure; receiving a location of interest within at least one of the plurality of images; determining an orientation of the elongated structure in response to receiving the location of interest; adjusting image planes of each of the plurality of images to correspond with the orientation of the elongated structure; and causing the elongated structure to be displayed in the adjusted image planes.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
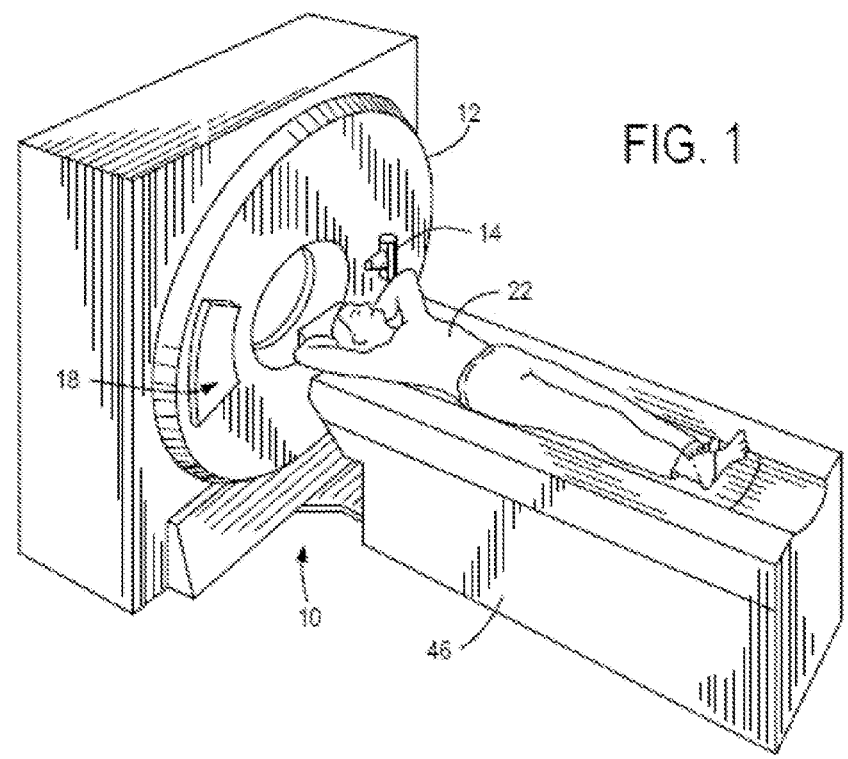
FIG. 1 is a perspective view of an illustrative computed tomography (CT) imaging system for use with some embodiments of the disclosed subject matter.

In describing exemplary embodiments of the disclosed subject matter illustrated in the drawings, specific terminology may be employed for the sake of clarity. However, the disclosed subject matter is not intended to be limited to the specific terminology so selected, and it is to be understood that each specific element includes all technical equivalents which operate in a similar manner.

As used herein, the term "image" may refer to multi-dimensional data composed of discrete image elements (e.g., pixels for two-dimensional images and voxels for three-dimensional images). The image may be, for example, a medical image of a subject collected using a computer tomography system, a magnetic resonance imaging system, an ultrasound imaging system, or any other medical imaging system or imaging modality known to one of skill in the art. The image may also be provided from non-medical contexts, such as, for example, remote sensing systems, electron microscopy systems, etc. Although an image can be thought of as a function from R3 to R, the methods of the disclosed subject matter are not limited to such images, and can be applied to images of any dimension, e.g., a two-dimensional picture, a three-dimensional volume, or a four-dimensional space. For a two-dimensional or three-dimensional image, the domain of the image is typically a two-dimensional or three-dimensional rectangular array, where each pixel or voxel can be addressed with reference to a set of two or three mutually orthogonal axes.

It should also be noted that, although the embodiments described herein generally relate to analyzing images that contain blood vessels and, more particularly, vessel lumen for detecting emboli, this is merely illustrative. The disclosed subject matter can be used to analyze images having any suitable elongated structure, such as blood vessels, lymphatic vessels, airways, gastrointestinal tracts (e.g., portions of the large or small intestine, colon, etc.), and the like.

In accordance with some embodiments of the disclosed subject matter, an image inspection application (sometimes referred to herein as "the application") is provided. The image inspection application can receive images of an elongated structure, receive a location of interest within the images of the elongated structure, determine an orientation of the elongated structure in response to the location of interest, and reformat the images of the elongated structure in alignment with the determined orientation of the elongated structure.

Figure 2:
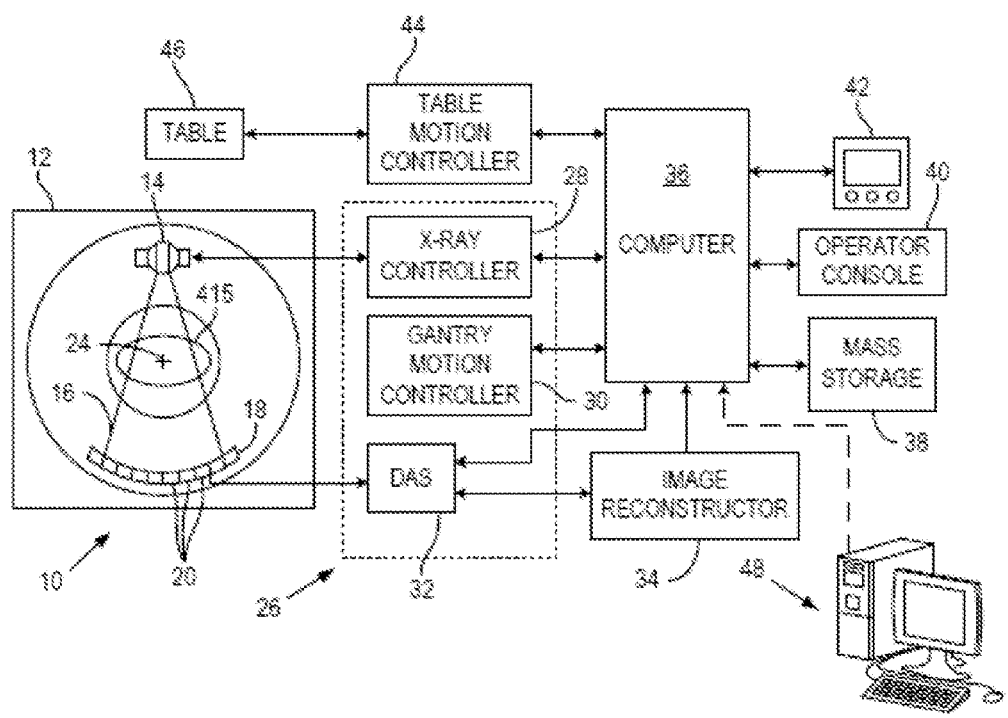
FIG. 2 is a block diagram of an illustrative computed tomography (CT) imaging system shown in FIG. 1.

With initial reference to FIGS. 1 and 2, an x-ray CT imaging system 10 includes a gantry 12 representative of a "third generation" CT scanner. However, this is for exemplary purposes only, as the present invention is not limited to any particular "generation" of CT system or, for that matter, a specific instantation of imaging modality, as long as the medical imaging system is capable of providing images or imaging data with the features or information described in detail below.

The gantry 12 has an x-ray source 14 that projects a fan-beam, or cone-beam, of x-rays 16 toward a detector array 18 on the opposite side of the gantry 12. The detector array 18 is formed by a number of detector elements 20, which together sense the projected x-rays 16 that pass through a medical patient or subject 22 being imaged. Each detector element 20 produces an electrical signal that represents the intensity of an impinging x-ray beam and hence the attenuation of the beam as it passes through the subject 22.

During a scan to acquire x-ray projection data, the gantry 12 and the components mounted thereon rotate about a center of rotation 24 located within the subject 22. The rotation of the gantry 12 and the operation of the x-ray source 14 are governed by a control mechanism 26 of the CT system. The control mechanism 26 includes an x-ray controller 28 that provides power and timing signals to the x-ray source 14 and a gantry motor controller 30 that controls the rotational speed and position of the gantry 12. A data acquisition system ("DAS") 32 in the control mechanism 26 samples analog data from detector elements 20 and converts the data to digital signals for subsequent processing. An image reconstructor 34, receives sampled and digitized x-ray data from the DAS 32 and performs image reconstruction, for example, using a filtered backprojection or other image reconstruction process. The reconstructed image is applied as an input to a computer 36 that stores the image and the raw imaging or attenuation data in a mass storage device 38.

The computer 36 also receives commands and scanning parameters from an operator via console 40. An associated display 42 allows the operator to observe the reconstructed image and other data from the computer 36. The operator supplied commands and parameters are used by the computer 36 to provide control signals and information to the DAS 32, the x-ray controller 28 and the gantry motor controller 30. In addition, the computer 36 operates a table motor controller 44 that controls a motorized table 46 to position the subject 22 in the gantry 12. As will be described, the present invention may be performed in conjunction with or programmed to operate on the computer 36, the display 42 and/or operator console 40 and/or may utilize or be programmed to operate as a separate system 48 that is connected to or separate from the computer 36, display 42, and operator console 40.

As will be described below, the disclosed subject matter may be implemented with a computer aided detection (CAD) system or a more general inspection system that works not only for general processing of images and analysis of computer aided detection findings, but at any suitable location of interest, including a radiologist's own findings.

For example, the disclosed subject matter can be utilized with a system for image analysis and processing that includes scanning the images of the lungs with a concentration-oriented tobogganing algorithm to form PE candidates. Generally speaking, it should be noted that the hardware and/or software of the disclosed subject matter can be implemented as part of other equipment or can be implemented as stand-alone equipment (which can be coupled to other equipment). For example, an exemplary system is described in J. Liang and J. Bi, "Computer-aided detection of pulmonary embolism with tobogganing and multiple instance classification in CT pulmonary angiography," in Proceedings of the 20th International Conference on Information Processing in Medical Imaging, 20th International Conference, IPMI 2007, Kerkrade, The Netherlands, 2007, pp. 630-641; J. Liang and J. Bi, "Local Characteristic Features for Computer-Aided Detection of Pulmonary Embolism in CT Angiography," Proceedings of the First Workshop on Pulmonary Image Analysis, New York, N.Y., Sep. 6, 2008, pp. 263-272; and J. Bi and J. Liang, "Multiple instance learning of pulmonary embolism detection with geodesic distance along vascular structure," in Proceedings of IEEE Computer Society Conference on Computer Vision and Pattern Recognition (CVPR'07), Minneapolis, Minn., USA, 2007, which are hereby incorporated by reference herein in their entireties.

Additionally or alternatively, the disclosed subject matter may be used independently of any computer aided detection system. That is, in addition or alternatively to starting from CAD-identified prospects, the inspect ion system can be focused on a location selected by a clinician, for example, by clinician selection of a location via a mouse click or touch indication within an image. Some embodiments of the inspection system can be launched by clicking at any location of an elongated structure of interest in an image. Some examples of elongated structures include blood vessels, lymphatic vessels, airways, gastrointestinal tracts, the colon, and other such structures.

Figure 3:
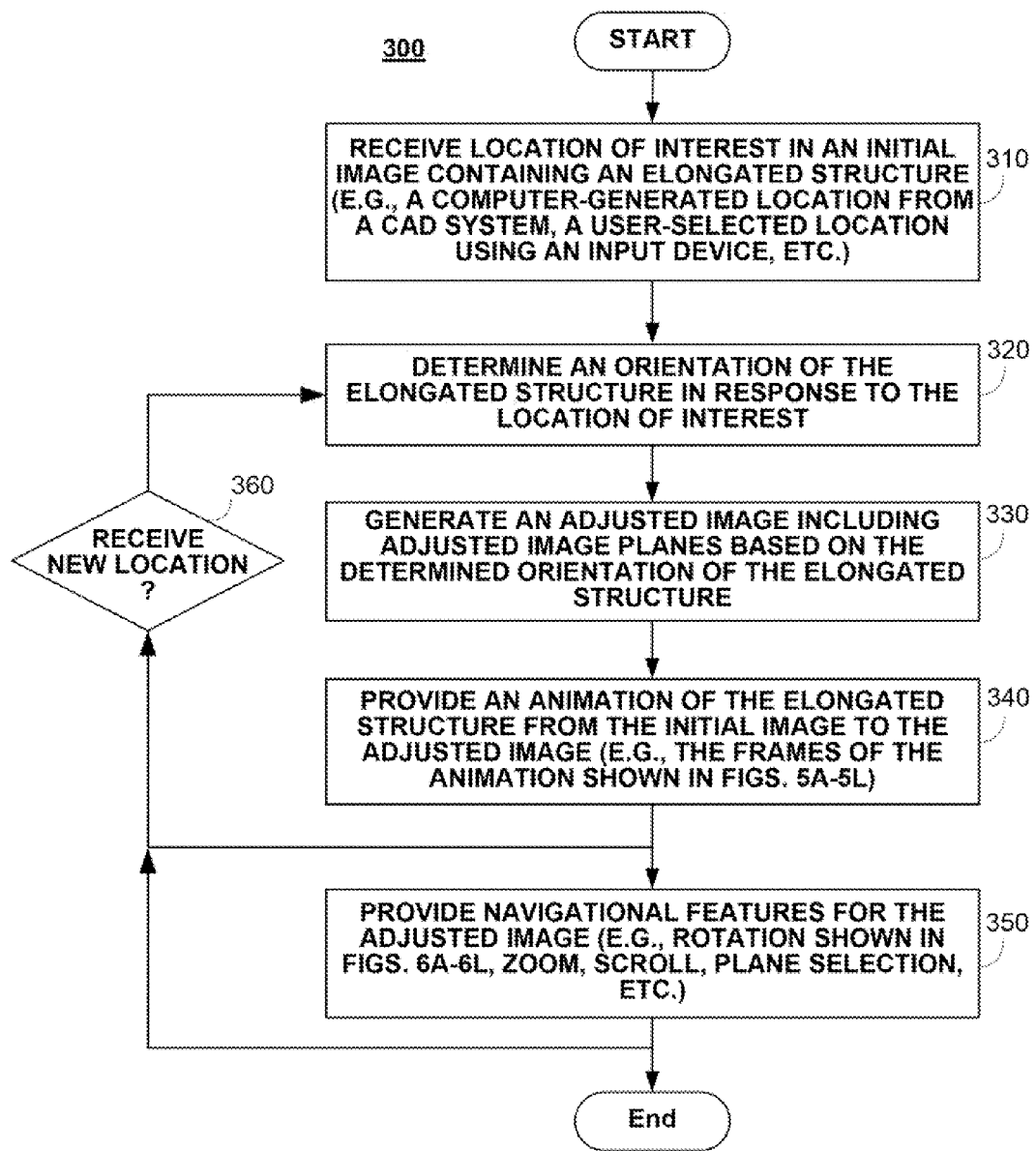
FIG. 3 is an illustrative example of a process for generating and/or analyzing one or more images containing an elongated structure in accordance with some embodiments of the disclosed subject matter.

Turning to FIG. 3, FIG. 3 shows an illustrative flow diagram 300 for generating and/or analyzing an image containing an elongated structure in accordance with some embodiments of the disclosed subject matter.

At 310, a location of interest in an initial image containing an elongated structure can be received. As described above, the initial image may refer to multi-dimensional data composed of discrete image elements (e.g., pixels for two-dimensional images and voxels for three-dimensional images). The image can be, for example, a medical image of a subject collected using a computer tomography system, a magnetic resonance imaging system, an ultrasound imaging system, or any other medical imaging system or imaging modality known to one of skill in the art. The image can also be provided from non-medical contexts, such as, for example, remote sensing systems, electron microscopy systems, etc. Although an image can be thought of as a function from R3 to R, the methods of the disclosed subject matter are not limited to such images, and can be applied to images of any dimension, e.g., a two-dimensional picture, a three-dimensional volume, or a four-dimensional space. For a two-dimensional or three-dimensional image, the domain of the image is typically a two-dimensional or three-dimensional rectangular array, where each pixel or voxel can be addressed with reference to a set of two or three mutually orthogonal axes.

In some embodiments, the location of interest can be received from a user selection. For example, a user using a user input device can select a point within an elongated structure in a displayed image as the location of interest. In response, the location of interest selected by the user can be highlighted or otherwise indicated. In another example, the location of interest associated with the image can be retrieved from a database of findings provided by a radiologist or any other suitable medical professional. Alternatively, the location of interest can be received from a remote system. For example, a computer-aided detection system can review the image and determine the location of interest.

It should be noted that, in some embodiments, the location of interest can be received from both a user selection and a remote system, such as a computer-aided detection system. For example, an initial location of interest can be determined, retrieved, and/or indicated by a computer-aided detection system and a user can be provided with an opportunity to confirm the initial location of interest or select an alternate location of interest within the elongated structure in the displayed image. In another example, an initial location of interest can be received from a user selection and the user-selected location can be transmitted to a remote system, such as a computer-aided detection system, for verification.

It should also be noted that, in some embodiments, the user selection or a computer-aided finding of a location of interest is the only location received prior to automatically generating an adjusted image of the elongated structure (e.g., where the longitudinal axis of the elongated structure is aligned with the vertical centerline of the display window, where an axis of the elongated structure is aligned with the horizontal centerline of the display, etc.).

Regardless of whether the locations of interest and/or localizations are determined by a computer-aided detection system or user input, the inspection system of the disclosed subject matter can allow the image planes to be adjusted or reformatted to be in alignment with a longitudinal axis of an elongated structures. In doing so, the user can be provided with an opportunity to navigate along the longitudinal axis and rotate around the axis, thereby facilitating a thorough inspection of the structure from multiple perspectives and providing a compelling demonstration of any defects inside the structure.

Referring back to FIG. 3, in response to receiving the location of interest, an orientation of the elongated structure within the image can be determined based on the location of interest. In some embodiments, the orientation of the elongated structure can be determined by determining the longitudinal axis of the elongated structure.

Figure 4:
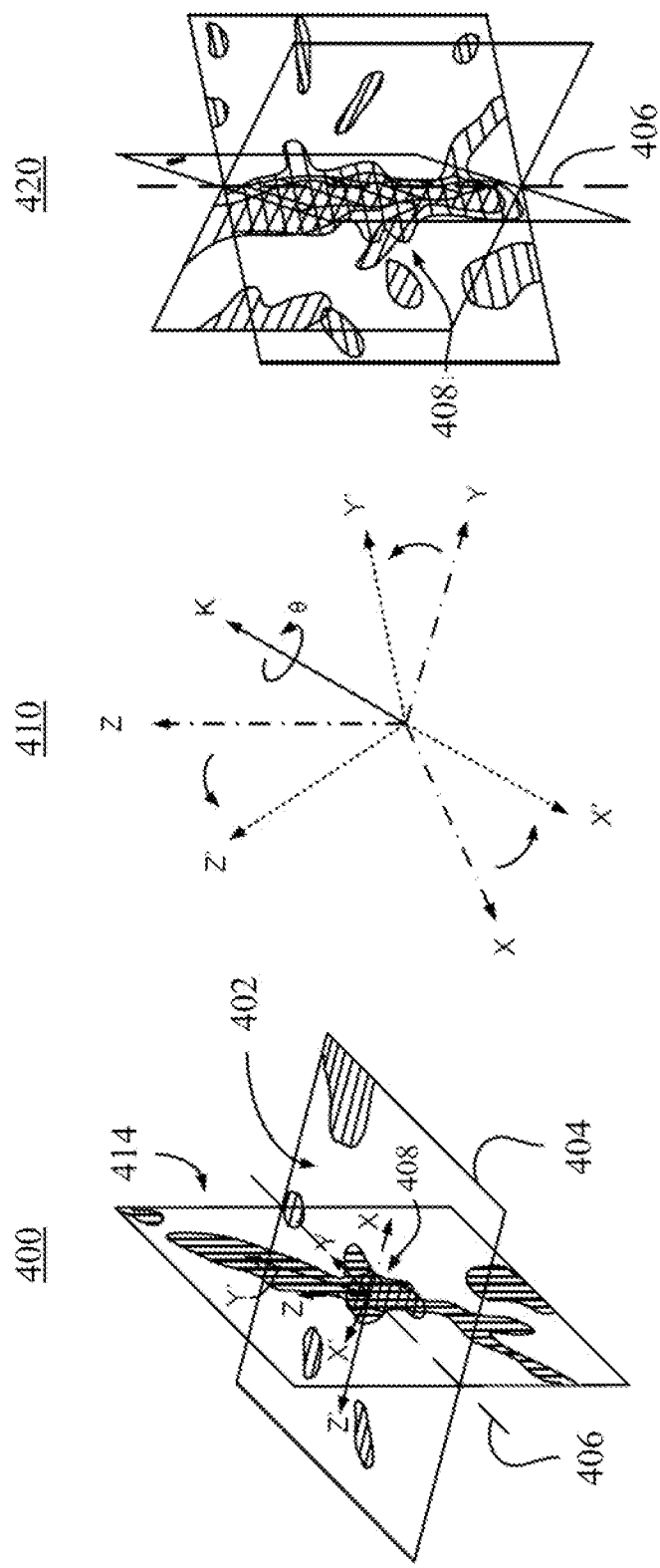
FIG. 4 is an illustrative representation of aligning, reformatting, and/or adjusting an elongated structure contained in an image in accordance with some embodiments of the disclosed subject matter.

For example, FIG. 4 shows general orientation axes x-y-z 400 with an image 402 aligned in plane x-y 404 such that the image 402 is displayed with axis x generally pointing to the right, axis y generally pointing to the top, and axis z generally pointing out of the image. The orientation of the image 402, as defined by a longitudinal axis 406 of a segment of an elongated structure 408, such as a vessel, at the location of interest can be determined using a structure tensor. It should be noted that the structure tensor can be used to summarize the predominant directions of a gradient in a specified neighborhood of the location of interest.

Given a three-dimensional (3D) volume image dataset $f(x, y, z)$ with gradient $\nabla f(f'_x, f'_y, f'_z)$, the gradient tensor $T(v)$ at voxel $v$ can be represented as:

$$T(v) = \begin{bmatrix} t_{11}(v) & t_{12}(v) & t_{13}(v) \\ t_{21}(v) & t_{22}(v) & t_{23}(v) \\ t_{31}(v) & t_{32}(v) & t_{33}(v) \end{bmatrix} = \begin{bmatrix} f'_x(v) \cdot f'_x(v) & f'_x(v) \cdot f'_y(v) & f'_x(v) \cdot f'_z(v) \\ f'_y(v) \cdot f'_x(v) & f'_y(v) \cdot f'_y(v) & f'_y(v) \cdot f'_z(v) \\ f'_z(v) \cdot f'_x(v) & f'_z(v) \cdot f'_y(v) & f'_z(v) \cdot f'_z(v) \end{bmatrix}$$

The structure tensor can be obtained by spatially averaging the entries of the gradient tensor with a Gaussian filter:

$$S(v) = [s_{ij}(v)];$$

$$s_{ij} = g_\sigma * t_{ij};$$

$$i, j \in 1, 2, 3;$$

where $g_\sigma$ is a Gaussian with standard deviation $\sigma$ and * denotes convolution. Each entry $s_{ij}(v)$ in the structure tensor $S(v)$ may not simply be a product of the gradients at voxel, v, as in gradient tensor $T(v)$, but a spatially-weighted average of the products of gradients in the neighborhood of voxel, v, with a Gaussian. The Gaussian weighted spatial averaging can combine gradient information over a neighborhood, providing a robust solution in determining the orientation of the elongated structure. From structure tensor, as illustrated in FIG. 4, the orientation of the elongated structure can be determined as denoted with axis Y', yielding a new image in plane (x'-y') illustrated relative to general orientation axes x-y-z 400.

It should be noted that the three-dimensional structure tensor S(v) includes three eigenvalues $\lambda_1$, $\lambda_2$, and $\lambda_3$, where $\lambda_1 \geq \lambda_2 \geq \lambda_3$, and their corresponding eigenvectors $e_1$, $e_2$, and $e_3$ that summarize the distribution of the gradient $\nabla f(f_x, f_y, f_z)$ within the window defined by $\sigma$ centered at voxel, v. Therefore, in case of an elongated structure, such as a vessel, $\lambda_1 \approx \lambda_2 \gg \lambda_3$ is expected. The eigenvector $e_3$ associated with the smallest eigenvalue $\lambda_3$ corresponds to the longitudinal axis of the elongated structure, while $e_1$ and $e_2$ form an image plane perpendicular to the orientation of the elongated structure. In some embodiments, the inspection system can choose to reformat an image plane based on eigenvectors $e_1$ and $e_3$, in which $e_1$ is referred as the x axis, and $e_3$ is referred as y axis (aligned with the vertical centerline), and $e_2$ is referred as the z axis (pointing to the user).

It should be noted that, although the embodiments described herein generally determine the orientation of the elongated structure using a structure tensor, any suitable approach for determining the orientation or longitudinal axis of the structure can be used. For example, in some embodiments, the orientation of the elongated structure can be determined by segmenting the elongated structure. In another example, the orientation of the elongated structure can be determined by the eigenvectors of the Hessian matrix.

Figure 5:
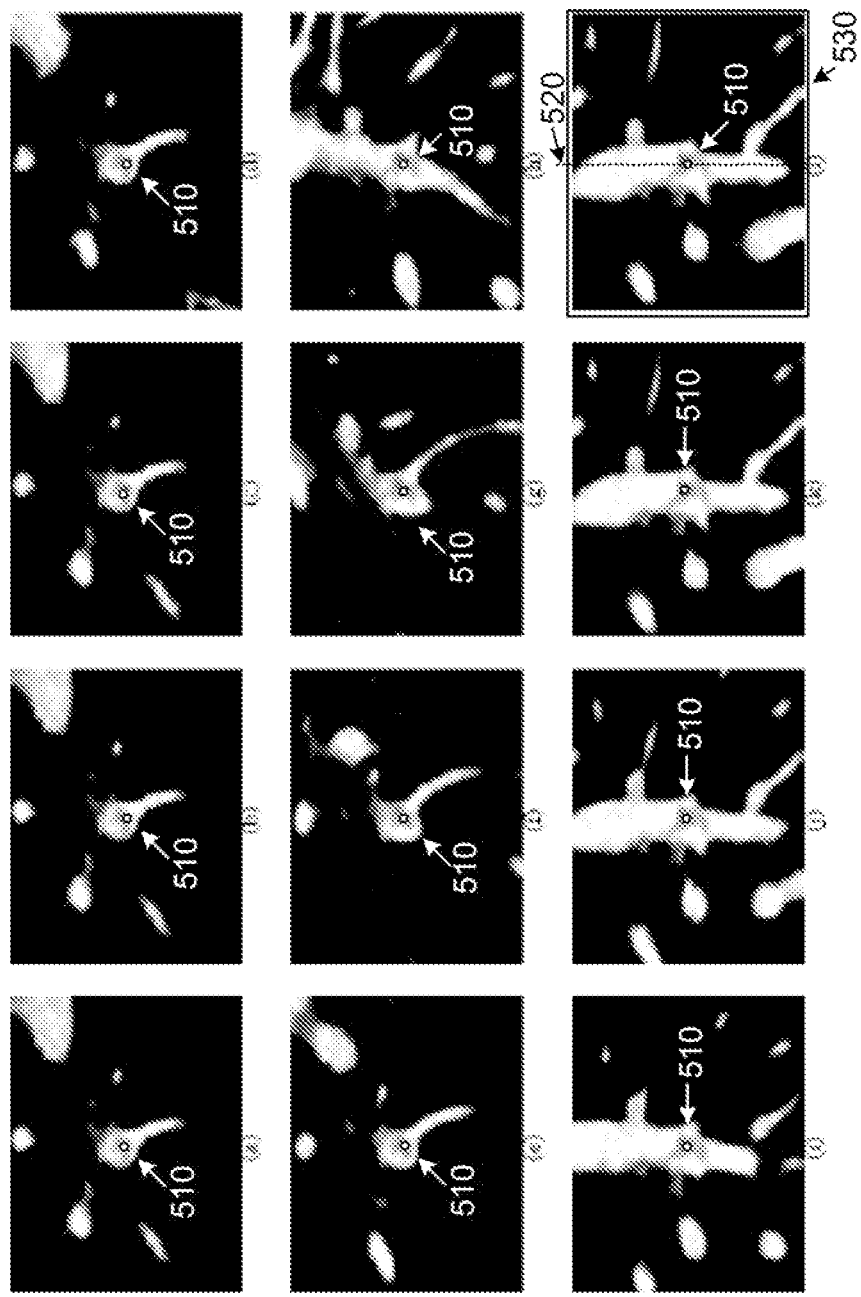
FIGS. 5A-L is an illustrative series of images showing an elongated structure, such as a vessel, as it is rotated into an imaging plane aligned with a longitudinal axis of the elongated structure in accordance with some embodiments of the disclosed subject matter.
Figure 6:
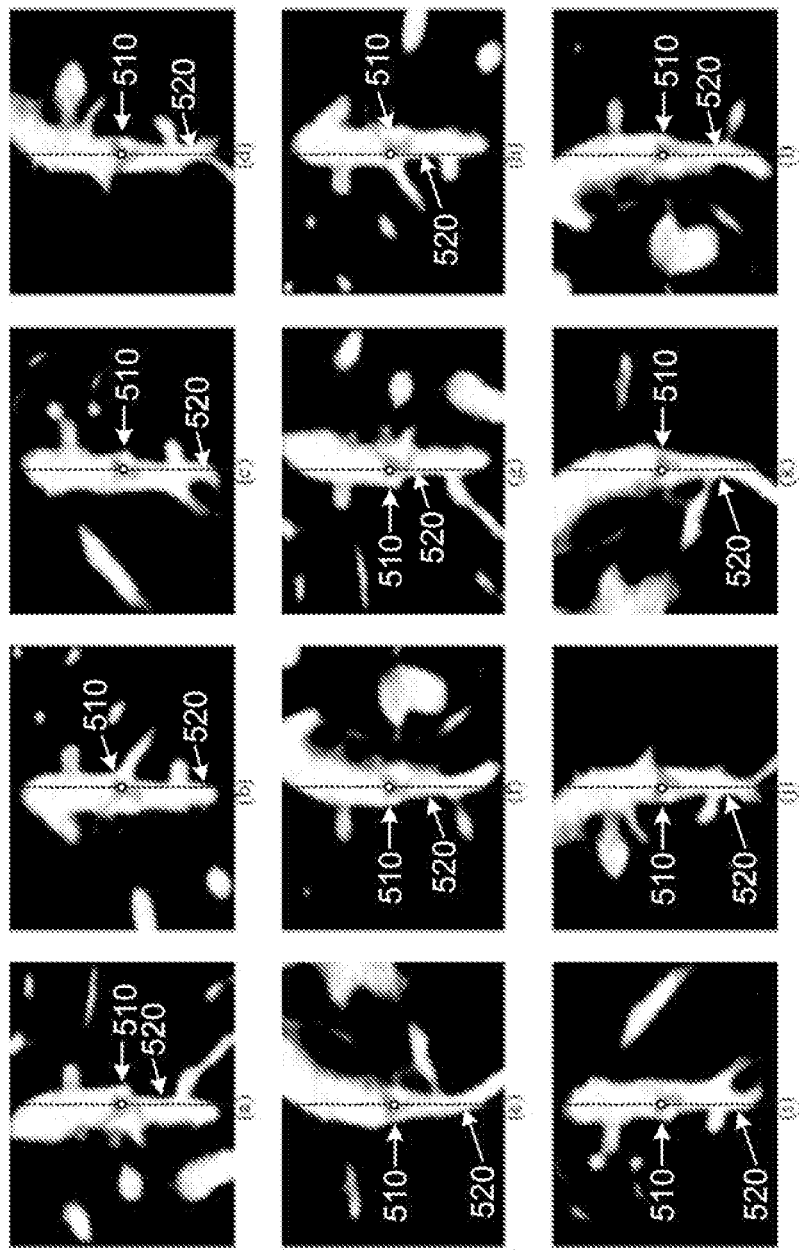
FIGS. 6A-L is an illustrative series of images showing an elongated structure, such as a vessel, as it is spun about a longitudinal axis of the elongated structure in accordance with some embodiments of the disclosed subject matter.
Figure 7:
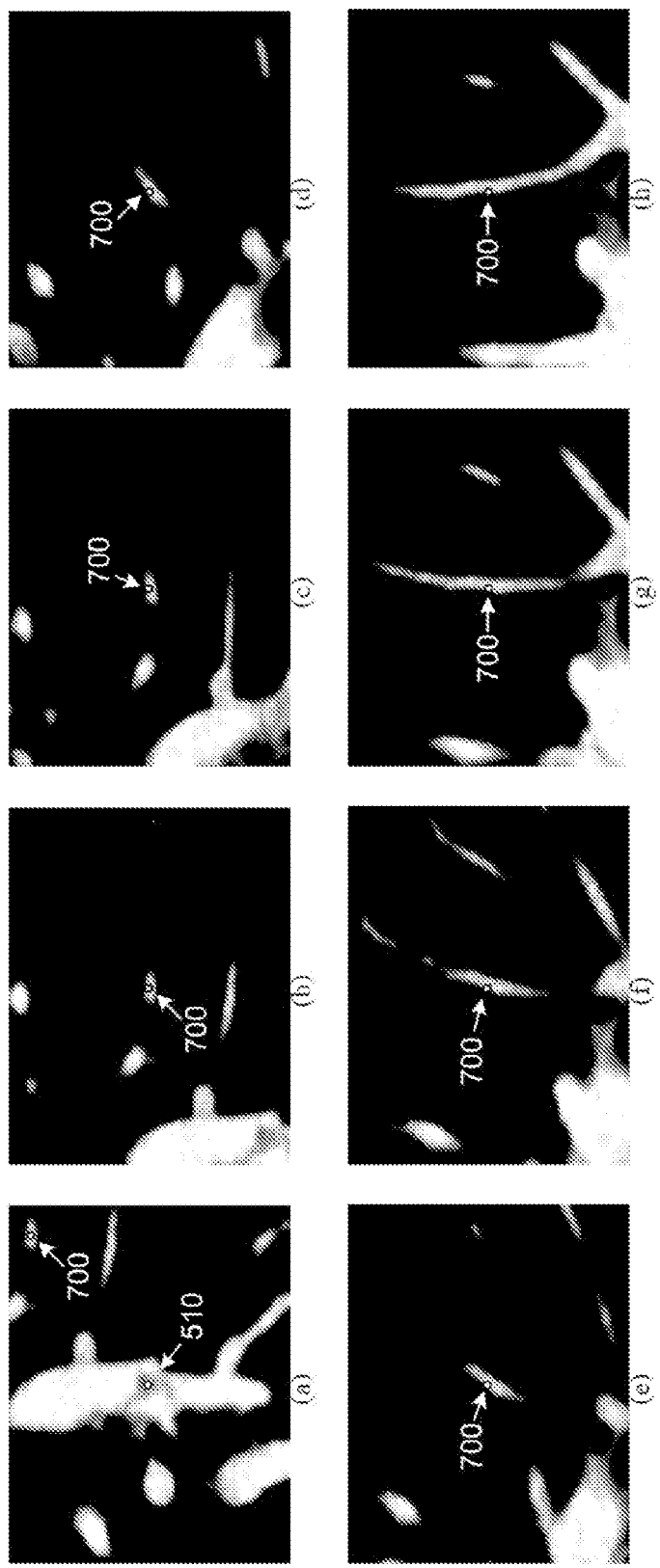
FIGS. 7A-H is an illustrative series of images showing the alignment, reformatting, or adjustment of the elongated structure as an updated location of interest is received in accordance with some embodiments of the disclosed subject matter.

In response to determining the orientation of the elongated structure, an adjusted image can be displayed at 330, where the longitudinal axis of the elongated structure can be aligned with the vertical centerline of the display window. For example, as shown in FIG. 5A, the location of interest 510 can be received. In response to determining the orientation of the elongated structure of FIG. 5A, an adjusted image shown in FIG. 5L can be displayed, where the longitudinal axis of the elongated structure is aligned with the vertical centerline 520 of the display window 530.

It should be noted that the elongated structure can be aligned with any suitable portion of the display window 530. For example, an axis of the elongated structure can be aligned with the horizontal centerline of the display window 530.

In some embodiments, an animation (or any other suitable sequence of images) of the elongated structure from the initial image to the adjusted image can be provided to a user of the inspection system at 340. For example, to maintain visual context and/or maintain the visual orientation of a user of the inspection system, the inspection system can animate the rotation and/or adjustment of the elongated structure as a movie or any other suitable series of images. In a more particular example, FIGS. 5A-5L show an illustrative series of images showing an elongated structure, such as a vessel, as it is rotated into an adjusted imaging plane aligned with the longitudinal axis of the elongated structure.

In some embodiments, the animation or series of images can be created using rotation matrices in accordance with Euler's rotation theorem. For example, referring back to FIG. 4 and, more particularly, to axes 410 in FIG. 4, given display axes (x-y-z) 400, the inspection system can represent orientation axes (x'-y'-z') 410 of the elongated structure as rotation matrixes, A and A', relative to the global coordinate system. The rotation matrix for aligning display axes (x-y-z) 400 with orientation axes (x'-y'-z') 410 of the elongated structure can be computed as:

$$R = \begin{bmatrix} r_{11} & r_{12} & r_{13} \\ r_{21} & r_{22} & r_{23} \\ r_{31} & r_{32} & r_{33} \end{bmatrix} = A^T A'.$$

In accordance with Euler's rotation theorem, in a three-dimensional space, any two Cartesian coordinate systems with a common origin are related by a rotation about some fixed axis K at some degree of angle $\theta$:

$$\theta = arcos\left(\frac{r_{11} + r_{22} + r_{33} - 1}{2}\right)$$

$$K = \begin{bmatrix} k_x \\ k_y \\ k_z \end{bmatrix} = \frac{1}{2\sin\theta} \begin{bmatrix} r_{32} - r_{23} \\ r_{13} - r_{31} \\ r_{21} - r_{12} \end{bmatrix}$$

As also shown in FIG. 4, with the availability of the fixed axis K and the degree of angle $\theta$, the rotation about axis K can be animated by gradually changing the rotation angle from 0 to $\theta$. For an arbitrary intermediate angle $\phi$ ($0 \leq \phi \leq \theta$), the inspection system can compute the rotation matrix as:

$$R^\phi = \begin{bmatrix} k_x k_x (1-\cos(\phi)) + \cos(\phi) & k_y k_x (1-\cos(\phi)) - k_z \sin(\phi) & k_z k_x (1-\cos(\phi)) + k_y \sin(\phi) \\ k_x k_y (1-\cos(\phi)) + k_z \sin(\phi) & k_y k_y (1-\cos(\phi)) + \cos(\phi) & k_z k_y (1-\cos(\phi)) - k_x \cos(\phi) \\ k_x k_z (1-\cos(\phi)) - k_y \sin(\phi) & k_y k_z (1-\cos(\phi)) + k_x \sin(\phi) & k_z k_z (1-\cos(\phi)) + \cos(\phi) \end{bmatrix}$$

As a result, the inspection system can use the above-mentioned equations to yield the intermediate display axes $A\phi = AR\phi$, from whose x-y plane a new image is reformatted for display, resulting in a "rotating," "flying," or otherwise animated effect with $\phi$ running from 0 to $\theta$. For example, using the above-mentioned equations, the inspection system can determine the rotation matrices for generating an animation of images, where some of the images contained in the animation are shown in FIGS. 5A-5L. As shown, an elongated structure, such as a vessel, is rotated and animated into an adjusted imaging plane aligned with the longitudinal axis of the elongated structure (shown in FIG. 5L).

Referring back to FIG. 3, in some embodiments, the inspection system can provide the user of the inspection system with one or more navigational features for analyzing the elongated structure at 350.

For example, in some embodiments, the inspection system can allow the user to spin the elongated structure about its longitudinal axis. As shown in FIGS. 6A-6L, in response to determining the orientation of the elongated structure for the location of interest 510, the inspection system can use the above-mentioned rotation matrices or any other suitable matrices to generate intermediary image frames showing the elongated structure spinning around the longitudinal axis or the vertical centerline 520 of the display window. In some embodiments, the inspection system can generate one or more intermediary image frames showing the rotation of the elongated structure around its longitudinal axis in response to receiving a direction indication from the user (e.g., spin left, spin right, etc.).

In another example, the inspection system can allow the user to zoom into a portion of the aligned elongated structure for further analysis. The user can zoom into and out of a particular portion of the elongated structure. In yet another example, the inspection system can allow the user to scroll in any suitable direction (e.g., up, down, left, right, along the longitudinal axis, etc.) within an image plane. In a further example, the inspection system can allow the user to select an adjacent image plane (e.g., selecting the next image plane in an animation or sequence of images, selecting the next image plane when the elongated structure is rotating about its longitudinal axis, etc.).

Referring back to FIG. 3, in some embodiments, the inspection system can allow the user to select a new or updated location of interest within the elongated structure. For example, the inspection system can provide the user with an opportunity to select a new location within the same vessel branch or proceed to a different vessel branch in the image. For example, as shown in FIG. 3, in response to detecting that a new location has been received (e.g., a user selection at a new location of interest, a new finding by a computer-assisted detection system), the inspection system can return back to step 320. For example, in response to receiving the new location of interest, the inspection system can determine the orientation or longitudinal axis of the elongated structure based on the new location of interest, generate an adjusted image that includes rotating the elongated structure to align the newly determined longitudinal axis with the vertical centerline of the display window, and/or providing an animation of the elongated structure to the adjusted image and other navigation features to the user.

In a more particular example, FIGS. 7A-7H show a series of images illustrating the alignment, reformatting, or adjustment of the elongated structure as an updated location of interest is received in accordance with some embodiments of the disclosed subject matter. As shown, in response to detecting that a new location 700 has been received from a user selection, the inspection system determines the longitudinal axis of the structure corresponding to the new location 700, and aligns the longitudinal axis of the structure with the vertical centerline of the display window. As also shown by the intermediary images in FIGS. 7B-7G, the inspection system can generate an animation from the structure shown in FIG. 7A to the aligned structure shown in FIG. 7H. In some embodiments, the inspection system can provide additional navigational features for inspecting the structure corresponding to the new location 700 (e.g., zoom, scroll, image plane selection, etc.).

It should be noted that, although FIGS. 5A-5L, 6A-6L, and 7A-7H show multiple exemplary series of images, these are merely illustrative. For example, although FIGS. 6A-6L show intermediary image frames that are generated to show the elongated structure as it spins around the longitudinal axis or the vertical centerline of the display window, this is merely illustrative. Rather than two-dimensional slices, the inspection system can allow a user to navigate a four-dimensional or three-dimensional image. For example, as described above, the inspection system can use an imaging system, such as CT imaging system 10, to acquire three-dimensional data from an image of a vessel or any other suitable elongated structure. The imaging system 10 can then scan the vessel to generate a series of two-dimensional images associated with the vessel. The two-dimensional images can then be converted or transformed into a three-dimensional image of the vessel.

Figure 8:
FIG. 8 is an illustrative three-dimensional image of the elongated structure, such as a vessel, in accordance with some embodiments of the disclosed subject matter.

An illustrative example of such a three-dimensional representation of the elongated structure in accordance with some embodiments of the disclosed subject matter is shown in FIG. 8. As shown, the inspection system can allow a user to navigate a three-dimensional image of an elongated structure. As described above, in response to receiving a location of interest 800, the inspection system can align, orient, reformat, and/or adjust the elongated structure in the three-dimensional image to show the location of interest in the orientation shown in FIG. 8. It should be noted that the location of interest 800 can be a user-provided region (e.g., provided using an input device) or a computer-provided region (e.g., provided by a computer-aided detection system). Additionally, in some embodiments, the inspection system can determine and/or highlight a region of interest on the three-dimensional image for diagnosing and/or evaluating the elongated structure (e.g., for detecting pulmonary emboli, for providing visualization of vascular intensity levels and local vascular structure and occlusion, etc.).

It should be understood that the above steps of the flow diagrams of FIG. 3 may be executed or performed in any order or sequence not limited to the order and sequence shown and described in the figure. Also, some of the above steps of the flow diagrams of FIG. 3 may be executed or performed substantially simultaneously where appropriate or in parallel to reduce latency and processing times.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for generating and/or analyzing medical images having elongated structures are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for analyzing medical images, the method comprising:
   receiving, using a hardware processor, image data that includes a first plurality of image planes of an elongated structure;
   receiving, in a display window that displays the image data, a location of interest within an image plane of the first plurality of image planes that is currently being presented;
   determining an orientation of the elongated structure that is represented by a longitudinal axis based on the location of interest;
   aligning the longitudinal axis of the elongated structure in the first plurality of image planes with a centerline of the display window;
   generating a second plurality of image planes from the received image data based on the aligned longitudinal axis of the elongated structure, wherein the location of interest automatically becomes the center of each of the second plurality of image planes;
   in response to receiving the location of interest, causing an image sequence to be displayed in the display window that illustrates the elongated structure being rotated from the orientation to a resulting orientation in which the longitudinal axis is aligned with the centerline of the display window; and
   causing the second plurality of image planes of the elongated structure to be displayed in the display window.

2. The method of claim 1, wherein the longitudinal axis of the elongated structure is determined using a structure tensor, wherein the structure tensor summarizes predominant directions of a gradient in a neighborhood of the location of interest.

3. The method of claim 1, wherein the longitudinal axis of the elongated structure is determined by segmenting the elongated structure.

4. The method of claim 1, wherein the longitudinal axis of the elongated structure is determined using eigenvectors of a Hessian matrix.

5. The method of claim 1, further comprising causing an animation including at least one of the first plurality of image planes, the image sequence that includes at least one intermediary image plane that falls between the image plane and one of the second plurality of image planes, and at least one of the second plurality of image planes to be displayed within the display window.

6. The method of claim 5, wherein the animation includes an initial image plane that includes the elongated structure and a reformatted image plane that includes the elongated structure, wherein, in the reformatted image plane, the longitudinal axis of the elongated structure is aligned with a centerline of the display window.

7. The method of claim 5, wherein the animation is generated using rotation matrices by changing a rotation angle from 0 degrees to $\theta$ degrees.

8. The method of claim 5, wherein the centerline of the display window is at least one of: a vertical centerline and a horizontal centerline.

9. The method of claim 1, further comprising, in response to receiving an indication from a user, spinning the elongated structure in the second plurality of image planes around the longitudinal axis in the display window.

10. The method of claim 1, further comprising, in response to receiving an indication from a user, scrolling along the elongated structure in the second plurality of image planes along the longitudinal axis in the display window.

11. The method of claim 1, further comprising, in response to receiving an indication from a user, zooming in to or out of the elongated structure in the second plurality of image planes in the display window.

12. The method of claim 1, further comprising, in response to receiving an indication from a user, navigating around the elongated structure in the second plurality of image planes in the display window.

13. The method of claim 1, further comprising, in response to receiving a user selection of one of the second plurality of image planes, causing the selected image plane to be displayed to the user.

14. The method of claim 1, further comprising:
   receiving an updated location of interest;
   determining an updated orientation of the elongated structure that is represented by the longitudinal axis of the elongated structure at the updated location of interest;
   aligning the longitudinal axis of the elongated structure with the centerline of the display window;
   generating a third plurality of image planes from the received image data based on the aligned longitudinal axis to correspond with the updated orientation of the elongated structure at the updated location of interest;
   in response to receiving the updated location of interest, causing a second image sequence to be displayed in the display window that illustrates the elongated structure being rotated to the updated orientation of the elongated structure; and
   causing the elongated structure to be displayed in the third plurality of image planes.

15. The method of claim 14, wherein at least one of the location of interest and the updated location of interest is received from a computer-aided detection system.

16. The method of claim 1, wherein the location of interest is received from a user.

17. The method of claim 1, wherein the location of interest is generated by a computer system.

18. The method of claim 1, wherein the elongated structure includes at least one of a blood vessel, a lymphatic vessel, an airway, a gastrointestinal tract, and a colon.

19. A system for analyzing medical images, the system comprising:
   a processor that is configured to:
      receive image data that includes a first plurality of image planes of an elongated structure;
      receive, in a display window that displays the image data, a location of interest within an image plane of the first plurality of image planes that is currently being presented;
      determine an orientation of the elongated structure that is represented by a longitudinal axis based on the location of interest;
      align the longitudinal axis of the elongated structure in the first plurality of image planes with a centerline of the display window;
      generate a second plurality of image planes from the received image data based on the aligned longitudinal axis of the elongated structure, wherein the location of interest automatically becomes the center of each of the second plurality of image planes;

in response to receiving the location of interest, cause an image sequence to be displayed in the display window that illustrates the elongated structure being rotated from the orientation to a resulting orientation in which the longitudinal axis is aligned with the centerline of the display window; and cause the second plurality of image planes of the elongated structure to be displayed in the display window.

20. A non-transitory computer-readable medium containing computer-executable instructions that, when executed by a processor, cause the processor to perform a method for analyzing medical images, the method comprising:

receiving image data that includes a first plurality of image planes of an elongated structure;

receiving, in a display window that displays the image data, a location of interest within an image plane of the first plurality of image planes that is currently being presented;

determining an orientation of the elongated structure that is represented by a longitudinal axis based on the location of interest;

aligning the longitudinal axis of the elongated structure in the first plurality of image planes with a centerline of the display window;

generating a second plurality of image planes from the received image date based on the aligned longitudinal axis of the elongated structure, wherein the location of interest automatically becomes the center of each of the second plurality of image planes;

in response to receiving the location of interest, causing an image sequence to be displayed in the display window that illustrates the elongated structure being rotated from the orientation to a resulting orientation in which the longitudinal axis is aligned with the centerline of the display window; and causing the second plurality of image planes of the elongated structure to be displayed in the display window.

* * * * *